(12) United States Patent
Roelofs et al.

(10) Patent No.: US 7,737,190 B2
(45) Date of Patent: Jun. 15, 2010

(54) PROCESS TO PREPARE STABLE TRIFLUOROSTYRENE CONTAINING COMPOUNDS GRAFTED TO BASE POLYMERS USING A SOLVENT/WATER MIXTURE

(75) Inventors: Mark Gerrit Roelofs, Hockessin, DE (US); Zhen-Yu Yang, Hockessin, DE (US); Amy Qi Han, legal representative, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1026 days.

(21) Appl. No.: 11/388,272

(22) Filed: Mar. 24, 2006

(65) Prior Publication Data

US 2006/0276555 A1    Dec. 7, 2006

Related U.S. Application Data

(60) Provisional application No. 60/719,954, filed on Sep. 23, 2005, provisional application No. 60/664,744, filed on Mar. 24, 2005.

(51) Int. Cl.
 *C08J 5/20* (2006.01)
(52) U.S. Cl. .............. 521/27; 521/28; 521/32; 521/33
(58) Field of Classification Search ........... 521/27, 521/32, 33, 28
See application file for complete search history.

(56) References Cited

U.S. PATENT DOCUMENTS

| | | | |
|---|---|---|---|
| 6,150,426 A * | 11/2000 | Curtin et al. ............... 521/28 |
| 6,359,019 B1 * | 3/2002 | Stone et al. ............... 521/27 |
| 6,529,313 B1 * | 3/2003 | Lin et al. ............... 359/296 |
| 6,607,856 B2 * | 8/2003 | Suzuki et al. ............... 429/30 |
| 6,723,758 B2 * | 4/2004 | Stone et al. ............... 521/27 |
| 6,828,386 B2 * | 12/2004 | MacKinnon ............... 525/276 |
| 2002/0137806 A1 | 9/2002 | Stone et al. |
| 2004/0016693 A1 | 1/2004 | Stone et al. |
| 2005/0043319 A1 | 2/2005 | Schweighoffer et al. |
| 2006/0135715 A1 * | 6/2006 | Yang ............... 526/243 |
| 2006/0264576 A1 | 11/2006 | Roelofs et al. |
| 2006/0276556 A1 | 12/2006 | Roelofs et al. |
| 2008/0032184 A1 * | 2/2008 | Yang et al. ............... 429/46 |
| 2008/0206624 A1 * | 8/2008 | Choudhury et al. ............ 429/42 |

FOREIGN PATENT DOCUMENTS

| | | | |
|---|---|---|---|
| CN | 1346707 A | * | 5/2002 |
| CN | 1349962 A | * | 5/2002 |
| DE | 101 08 598 A1 | | 9/2002 |
| WO | WO 01/58576 A1 | | 8/2001 |
| WO | WO-01/58576 A1 | * | 8/2001 |

(Continued)

OTHER PUBLICATIONS

Feiring et al., Journal of Fluorine Chemistry, vol. 105, pp. 129-135 (2000).*

(Continued)

*Primary Examiner*—Peter D. Mulcahy
*Assistant Examiner*—Henry Hu

(57) ABSTRACT

A fluorinated ion exchange polymer is prepared by grafting at least one grafting monomer derived from trifluorostyrene on to at least one base polymer in a organic solvent/water mixture. These ion exchange polymers are useful in preparing catalyst coated membranes and membrane electrode assemblies used in fuel cells.

19 Claims, 1 Drawing Sheet

FOREIGN PATENT DOCUMENTS

| | | |
|---|---|---|
| WO | WO 03/018654 A1 | 3/2003 |
| WO | WO-03/018654 A1 * | 3/2003 |
| WO | WO 2005/003083 A1 | 1/2005 |
| WO | WO 2005/049204 A2 | 6/2005 |
| WO | WO 2005/113491 A1 | 12/2005 |
| WO | WO 2005/113621 A1 | 12/2005 |
| WO | WO 2006/102670 A1 | 9/2006 |
| WO | WO 2006/102672 A1 | 9/2006 |

OTHER PUBLICATIONS

Yoshitsuga Sone et. al., Proton Conductivity of Nafion 117 as Measured by a four-electrode AC Impedance Method, J. Electrochem. Soc., Apr. 1996, pp. 1254-1259, vol. 143: No. 4.

* cited by examiner

PROCESS TO PREPARE STABLE TRIFLUOROSTYRENE CONTAINING COMPOUNDS GRAFTED TO BASE POLYMERS USING A SOLVENT/WATER MIXTURE

This invention was made with government support under Contract No. DE-FC04-02AL67606 awarded by the U.S. Department of Energy. The government has certain rights in the invention.

FIELD OF THE INVENTION

The present invention relates to a novel compound grafted to a base polymer, and its use in electrochemical cells as membranes, and more particularly to the use of these grafted polymers in fuel cells.

BACKGROUND OF THE INVENTION

Electrochemical cells, such as fuel cells and lithium-ion batteries are known. Depending on the operating conditions, each type of cell places a particular set of requirements upon the electrolytes used in them. For fuel cells, this is typically dictated by the type of fuel, such as hydrogen or methanol, used to power the cell and the composition of the membrane used to separate the electrodes. Proton-exchange membrane fuel cells, powered by hydrogen as the fuel, could be run at higher operating temperatures than currently employed to take advantage of lower purity feed streams, improved electrode kinetics, better heat transfer from the fuel cell stack to improve its cooling. Waste heat is also employed in a useful fashion. However, if current fuel cells are to be operated at greater than 100° C. then they must be pressurized to maintain adequate hydration of typical proton-exchange membranes to support useful levels of proton conductivity.

There is an ongoing need to discover novel grafted films that improve the performance of the latest generation of electrochemical cells, such as fuel cells and lithium-ion batteries, to develop new membrane materials that will maintain adequate proton conductivity at lower levels of hydration and have sufficient durability for the intended application.

SUMMARY OF THE INVENTION

In a first aspect, the invention provides a grafting process for making a fluorinated ion exchange polymer membrane comprising:

(a) forming a monomer composition comprising at least one grafting monomer, in a mixture of water and one or more organic solvent;

wherein the grafting monomer comprises one or more of 1a or 1b:

1a

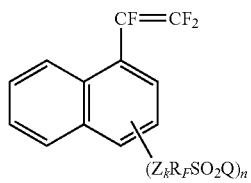

1b wherein comprises O, S, $SO_2$, or POR wherein comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;

$R_F$ comprises a linear or branched perfluoroalkylene group of 1 to 20 carbon atoms, optionally containing oxygen, sulfur or chlorine;

is chosen from F, —OM, —$NH_2$, —$N(M)SO_2R^2_F$, and —$C(M)(SO_2R^2_F)_2$, wherein comprises H, an alkali cation, or ammonium;

$R^2_F$ groups comprise alkyl of 1 to 14 carbon atoms which may optionally include ether oxygens or aryl of 6 to 12 carbon atoms where the alkyl or aryl groups may be perfluorinated or partially fluorinated;

and k is 0 or 1, n is 1 or 2 for 1a, and n is 1, 2, or 3 for 1b;

(b) irradiating at least one base polymer with ionizing radiation, and (c) contacting at least one base polymer with the monomer composition from step (a), at a temperature of about 0° C. to about 120° C. for about 0.1 hours to about 500 hours.

A second aspect of the invention is a polymer made by the process described above.

A third aspect of the invention is a catalyst coated membrane comprising a polymer electrolyte membrane having a first surface and a second surface, wherein the polymer electrolyte membrane comprises the polymer described above.

A fourth aspect of the invention is a membrane electrode assembly comprising a polymer electrolyte membrane, having a first surface and a second surface, wherein the polymer electrolyte membrane comprises the polymer described above.

A fifth aspect of the invention is an electrochemical cell comprising a membrane electrode assembly, wherein the membrane electrode assembly comprises a polymer electrolyte membrane, having a first surface and a second surface, wherein the polymer electrolyte membrane comprises the polymer described above. The electrochemical cell can be a fuel cell.

DETAILED DESCRIPTION OF THE INVENTION

Figure 1:
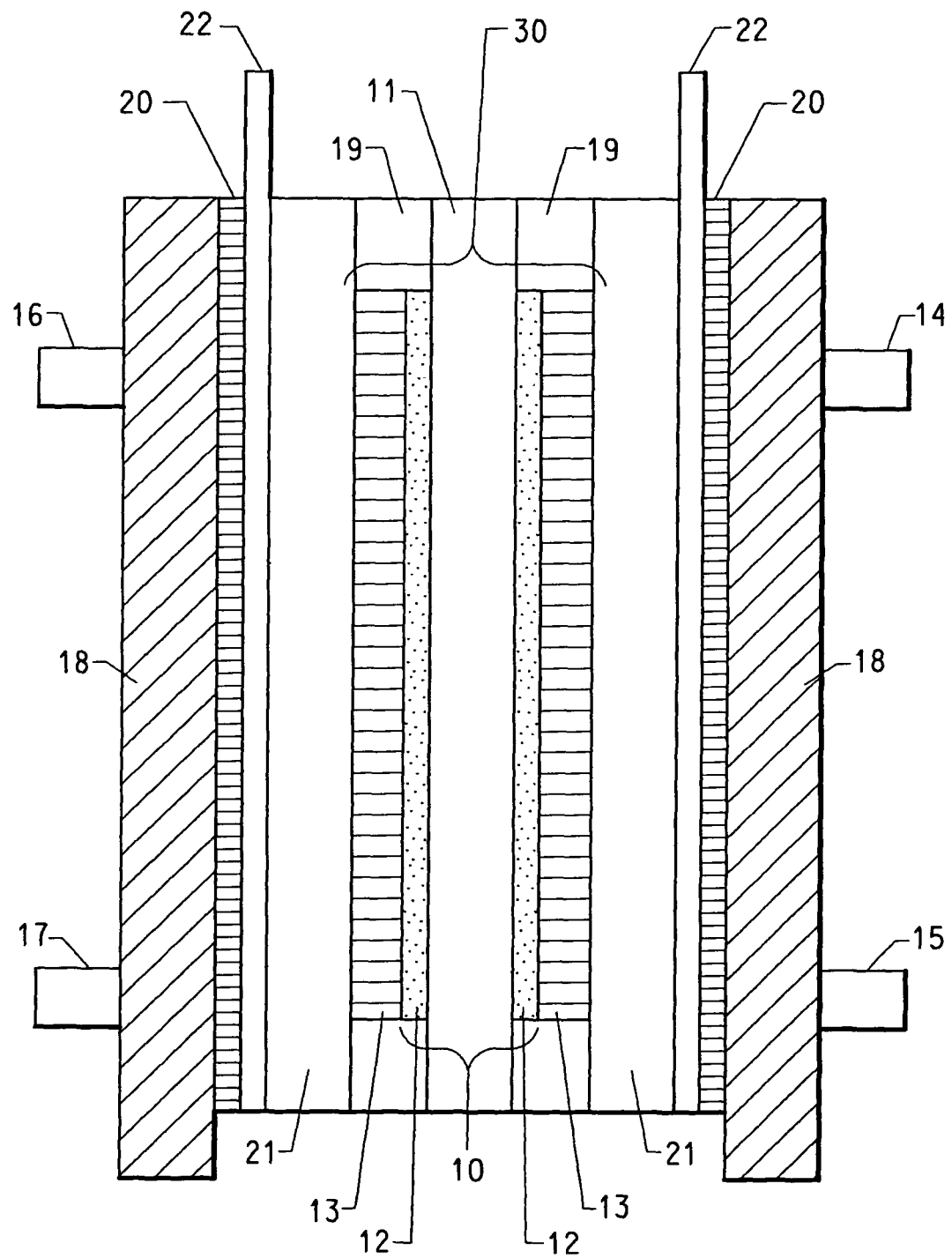
FIG. 1 is a schematic illustration of a single cell assembly.

Fluorinated Ion Exchange Polymer:

The fluorinated ion exchange polymers of the invention are useful as polymer electrolyte membranes in fuel cells, chloralkali cells, batteries, electrolysis cells, ion exchange membranes, sensors, electrochemical capacitors, and modified electrodes.

Processes for Making Grafted Polymers and Membranes:

The invention is directed to a grafting process for making a fluorinated ion exchange polymer membrane comprising the steps of:
(a) forming a monomer composition comprising at least one grafting monomer, in a mixture of water and one or more organic solvent; wherein the grafting monomer comprises one or more of 1a or 1b:

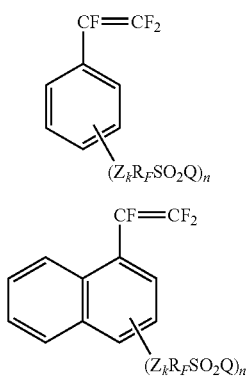

wherein
comprises O, S, SO$_2$, or POR wherein comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;

R$_F$ comprises a linear or branched perfluoroalkylene group of 1 to 20 carbon atoms, optionally containing oxygen, sulfur or chlorine;

is chosen from F, —OM, —NH$_2$, —N(M)SO$_2$R$^2$$_F$, and —C(M)(SO$_2$R$^2$$_F$)$_2$, wherein comprises H, an alkali cation, or ammonium;

R$^2$$_F$ groups comprise alkyl of 1 to 14 carbon atoms which may optionally include ether oxygens or aryl of 6 to 12 carbon atoms where the alkyl or aryl groups may be perfluorinated or partially fluorinated;

and k is 0 or 1, n is 1 or 2 for 1a, and n is 1, 2, or 3 for 1b;
(b) irradiating at least one base polymer with ionizing radiation, and
(c) contacting at least one base polymer with the monomer composition from step (a), at a temperature of about 0° C. to about 120° C. for about 0.1 hours to about 500 hours.

The attached pendant group(s) in Formulae 1, 2, 1 and 2 can be attached to any open valence in the ring. In Formulae 1 and 2b the pendant group can be attached to either ring in the structure, and if more than one pendant group is present, can be attached to one or both rings.

As used herein, organic solvent is defined to mean an organic solvent that is miscible or at least partially soluble with water, and in which the monomer is at least partially soluble, but not including alcohols or glycols. Typical solvents include acetonitrile, dimethylformamide (DMF), dimethylacetamide (DMAC), dimethylsulfoxide (DMSO), and glycol ethers of the formula R(OCH$_2$CH$_2$)$_p$OR, wherein R is an alkyl group and p is 1 to 12. In different embodiments of the invention, the water content, on a weight basis, of the water plus organic solvent mixture (water/{water+organic solvent}) is the range of 10% to 99.99%, and preferably in the range of 40% to 90%.

The mixture of water and organic solvent can optionally contain one or more surfactants. The surfactant can be anionic, cationic, or nonionic, and can be fluorinated. Suitable surfactants include, are not limited to, sodium dodecylsulfate, alkyl benzene sulfonates, dextrins, alkyl-ether sulfonates, ammonium sulfates, Triton® surfactants, and fluorinated surfactants such as C8 (ammonium perfluorooctanoate) Zonyl® fluorosurfactants such as Zonyl® 62, Zonyl® TBS, Zonyl® FSP, Zonyl® FS-62, Zonyl® FSA, Zonyl® FSH, and fluorinated alkyl ammonium salts such as but not limited to R'$_w$NH$_{(4-w)}$X wherein X is Cl$^-$, Br$^-$, I$^-$, F$^-$, HSO$_4^-$, or H$_2$PO$_4^-$, where R' is (R$_F$CH$_2$CH$_2$)—. Zonyl® fluorosurfactants are available from E. I. DuPont de Nemours, Wilmington, Del., and in general are anionic, cationic, amphoteric or nonionic oligomeric hydrocarbons containing ether linkages and fluorinated substituents. For example, Zonyl® FSP is an anionic surfactant of the formula (R$_f$CH$_2$CH$_2$)$_x$PO(O—NH$_4^+$)$_y$, where x+y=3 and Zonyl® FSH is a nonionic surfactant of the formula R$_f$CH$_2$CH$_2$O (CH$_2$CH$_2$O)$_w$H.

Enhancing additives can optionally be used to enhance the grafting rate or to enhance film quality. Suitable additives are water insoluble organic compounds that are solvents for the monomer or monomers used. One or more enhancing additives may be used. The enhancing additive is typically present at an amount of 0.5 to 300-weight % of the monomer. Suitable enhancing additives can include α,α,α-trifluorotoluene, dichlorobenzotrifluoride, chlorobenzotrifluoride, chlorobenzene, dichlorobenzene, trichlorobenzene, fluorobenzene, difluorobenzene, trifluorobenzene, perfluorobenzene, toluene, p-xylene, m-xylene, o-xylene, or C5-C10 aliphatic hydrocarbon, fluorohydrocarbon, fluorocarbon, and fluoroether.

In different embodiments of the invention, Q is F, R$_F$ is chosen from (CF$_2$)$_q$ wherein q=1 to 16, (CF$_2$)$_q$OCF$_2$CF$_2$ wherein q=1 to 12, and (CF$_2$CF(CF$_3$)O)$_q$CF$_2$CF$_2$ where q is 1 to 6, and R$^2$F is chosen from methyl, ethyl, propyl, butyl, and phenyl, each of which may be partially fluorinated or perfluorinated, or R$_F$ is chosen from (CF$_2$)$_q$ wherein q=1 to 4, (CF$_2$)$_q$OCF$_2$CF$_2$ wherein q=1 to 4, and (CF$_2$CF(CF$_3$)O)$_q$CF$_2$CF$_2$ where q is 1 to 2. R$^2$$_F$ can be chosen from perfluoromethyl, perfluoroethyl, and perfluorophenyl.

In the above process steps (b) and (c) can be performed simultaneously or sequentially.

The monomers can be obtained commercially or prepared using any process known in the art. Methods to prepare these monomers are detailed in WO2005/113621, WO2005/049204, WO2005/113491, and WO2005/003083, all herein incorporated entirely by reference.

Base Polymer:

The base polymer to be used as the substrate for the grafting reaction may be a homopolymer or copolymer of non-fluorinated, fluorinated, and perfluorinated monomers. Partially or completely fluorinated polymers often impart increased chemical stability and are more typical. The base polymer is typically chosen so that it imparts desirable mechanical properties to the final-grafted polymer, is stable to the irradiation used to activate the polymer for grafting, and is stable under the conditions to which it is exposed during use. For separators or membranes it is desirable that the base polymer be present in the form of a film, though other shapes may be desired depending on the electrochemical use. Some typical base polymers may include poly(ethylene-tetrafluoroethylene-termonomer) (ETFE) that comprises a terpolymer of ethylene and tetrafluoroethylene (TFE), in the range of 35:65 to 65:35 (mole ratios) with from 1 to 10 mole % of a termonomer, perfluorobutyl ethylene in the case of DuPont Tefzel®; ETFE copolymers also using other termonomers (Neoflon® ETFE); ECTFE that comprises a copolymer of ethylene and chlorotrifluoroethylene; FEP that comprises a copolymer of TFE and hexafluoropropylene (HFP), optionally containing a minor amount (1-3 mol %) of perfluoro (alkyl vinyl ether) (PAVE), usually perfluoro(propyl vinyl ether) (PPVE) or perfluoro(ethyl vinyl ether) (PEVE); PFA that comprises a copolymer of TFE and PAVE, wherein PAVE may be PPVE or PEVE; MFA that comprises a copolymer of TFE, PMVE, and PPVE; PTFE that comprises a homopolymer of TFE; modified PTFE, that contains up to 0.5 mol % of another monomer, usually a PAVE; PVF that comprises a polymer of vinyl fluoride (VF); PVDF that comprises a polymer of vinylidene fluoride (VF2); copolymers of VF2 and HFP which are sold under the trademarks KynarFlex® and Viton® A by Atofina and by DuPont, respectively; polyethylene and polypropylene. The term "modified" distinguishes these polymers from copolymers of TFE. The modified PTFE polymers are, like PTFE, not melt processable.

Typically, the base polymer may be chosen from poly (ethylene-tetrafluoroethylene), poly(ethylene-tetrafluoroethylene-termonomer) (Tefzel®, Neoflon® ETFE); poly(tetrafluoroethylene-hexafluoropropylene) (Teflon® FEP); poly (tetrafluoroethylene-perfluorovinylether) (Teflon® PFA), polytetrafluoroethylene (Teflon® PTFE); poly(ethylene-chlorotrifluoroethylene); poly(vinylidene fluoride) (Kynar® or Solef®); and poly(vinylidenefluoride-hexafluoropropylene) (Kynar® Flex). More typically, the base polymer is chosen from poly(ethylene-tetrafluoroethylene-termonomer), poly(tetrafluoroethylene-hexafluoropropylene), poly (tetrafluoroethylene-perfluoropropylvinylether), and poly (vinyledene fluoride).

Free radicals may be created in the base polymer in order to produce attachment sites for the grafting monomers using radiation. When the base polymer is in film form, the films are known as irradiated films. The radiation dosage should be sufficient to allow for the desired graft level to be reached, but not so high as to cause excessive radiation damage. Graft level is defined as (wt. of grafted polymer−wt. of base polymer)/ (wt. of base polymer). (This is also known as weight uptake). The ionizing radiation may be provided in the form of electron beam, gamma ray, or X-rays. Electron beam irradiation is typically performed at a high dose rate that may be advantageous for commercial production. The irradiation may be done while the base polymer is in contact with the grafting monomers (simultaneous irradiation and grafting). However, if the free radicals of the base polymer are sufficiently stable, then the irradiation may be performed first and in a subsequent step the base polymer may be brought into contact with the grafting monomers (post-irradiation grafting). Base polymers suitable for the post-irradiation grafting method are usually fluorinated polymers. In this case the irradiation may typically be done at sub-ambient temperatures, for example with base polymer cooled with dry ice, and it may be stored at a sufficiently low temperature to prevent decay of the free radicals prior to its use in the grafting reaction.

With some substrates, such as poly(ethylene-tetrafluoroethylene) the irradiation may be performed in the presence of oxygen or in an oxygen-free environment, and an appreciable graft level can be obtained in either case. Typically grafting may be performed in an inert gas, such as nitrogen or argon. This may be accomplished by loading the base polymer films, within an inert-atmosphere box, into oxygen-barrier bags, sealing them shut (with or without grafting monomers and solvent), and then irradiating. In the case of post-irradiation grafting, the base polymer may then also be stored in the oxygen-free environment before and during the grafting reaction.

The grafting reaction may be performed by exposing the base polymer to a monomer composition containing the grafting monomers. It is generally desirable to lower the quantity of fluorinated monomer used in the grafting reaction, and this may be accomplished by diluting it by forming a mixture with water and organic solvent, which thus increases the total working volume of the monomer composition. The monomer composition may thus be an emulsion made by mechanical or ultrasonic mixing of the monomers with water, the organic solvent, and optional surfactants. The monomer may also be additionally present in a separate phase and only partially soluble in the mixture of water and organic solvent.

Grafting may be accomplished by contacting the base polymer films, during irradiation or subsequent to irradiation, with the monomer composition and holding films at about 0° C. to about 120° C. for about 0.1 to about 500 hours. Typical temperatures are about 25° C. to about 100° C., more typically about 35 to about 90° C., and most typically about 40 to about 80° C. Typical times are about 10 min to about 300 hours, more typically about 1 hour to about 200 hours, and most typically about 1 hour to about 100 hours.

Subsequent to the grafting reaction, the emulsion, additive if present and unreacted monomer may be removed by extraction with a low-boiling solvent or through vaporization. The grafted polymer may also be extracted with a solvent in order to remove any polymer formed in the film that is not grafted to the base film.

Preparation of Ionic Polymers:

This invention provides for the facile conversion of the fluorosulfonyl fluorides to acid form, without the use of sulfonation reagents. Polymers grafted with the monomers bearing pendant sulfonyl fluoride groups may be hydrolyzed with bases such as MOH or $M_2CO_3$ (M=Li, Na, K, Cs, $NH_4$) or MOH in MeOH and/or DMSO, and water. The hydrolysis may usually be carried out at room temperature to about 100° C., typically at room temperature to about 80° C. With polymeric substrates such as PVDF that are sensitive to strong base, it is preferable to use the weaker carbonate bases that avoid decomposition of the substrate. Treatment of polymeric salts with acids such as $HNO_3$ gives polymeric acids.

The grafted sulfide polymers (Z=S) may be oxidized to sulfone polymers (Z=$SO_2$) using $CrO_3$ or hydrogen peroxide.

Electrochemical Cell:

As shown in FIG. 1, an electrochemical cell, such as a fuel cell, comprises a catalyst-coated membrane (CCM) (10) in combination with at least one gas diffusion backing (GDB) (13) to form an unconsolidated membrane electrode assembly (MEA). The catalyst-coated membrane (10) comprises a polymer electrolyte membrane (11) discussed above and catalyst layers or electrodes (12) formed from an electrocatalyst coating composition. The fuel cell may be further provided with an inlet (14) for fuel, such as hydrogen; liquid or gaseous alcohols, e.g. methanol and ethanol; or ethers, e.g. diethyl ether, etc., an anode outlet (15), a cathode gas inlet (16), a cathode gas outlet (17), aluminum end blocks (18) tied together with tie rods (not shown), a gasket for sealing (19), an electrically insulating layer (20), graphite or metal current collector blocks with flow fields for gas distribution (21), and gold plated current collectors (22).

Alternately, gas diffusion electrodes comprising a gas diffusion backing having a layer of an electrocatalyst coating composition thereon may be brought into contact with a solid polymer electrolyte membrane to form the MEA.

The electrocatalyst coating compositions used to apply the catalyst layers as electrodes on the CCM (10) or the GDE comprise a combination of catalysts and binders dispersed in suitable solvents for the binders, and may include other materials to improve electrical conductivity, adhesion, and durability. The catalysts may be unsupported or supported, typically on carbon, and may differ in composition depending on their use as anodes or cathodes. The binders may consist of the same polymer used to form the polymer electrolyte membrane (11), but may contain in part or be solely composed of other suitable polymer electrolytes as needed to improve the operation of the fuel cell. Some examples include Nafion® perfluorosulfonic acid, sulfonated polyether sulfones.

The fuel cell utilizes a fuel source that may be in the gas or liquid phase, and may comprise hydrogen, an alcohol, or an ether. The fuel is humidified to the degree required to maintain adequate ionic conductivity in the solid polymer electrolyte membrane discussed above so that the fuel cell provides a high power output. Depending on the operating temperature, the fuel cell may be operated at elevated pressures to maintain the required degree of humidification. Typically a gaseous humidified hydrogen feed or methanol/water solution may be supplied to the anode compartment, and air or oxygen supplied to the cathode compartment.

Catalyst Coated Membrane:

A variety of techniques are known for CCM manufacture, which apply an electrocatalyst coating composition similar to that described above onto a solid polymer electrolyte membrane. Some known methods include spraying, painting, patch coating and screen, decal, pad or flexographic printing.

In one embodiment of the invention, the MEA (30), shown in FIG. 1, may be prepared by thermally consolidating the gas diffusion backing (GDB) with a CCM at a temperature of under about 200° C., typically about 140 to about 160° C. The CCM may be made of any type known in the art. In this embodiment, an MEA comprises a solid polymer electrolyte (SPE) membrane with a thin catalyst-binder layer disposed thereon. The catalyst may be supported (typically on carbon) or unsupported. In one method of preparation, a catalyst film is prepared as a decal by spreading the electrocatalyst coating composition on a flat release substrate such as Kapton® polyimide film (available from the DuPont Company). After the coating dries, the decal is transferred to the surface of the SPE membrane by the application of pressure and heat, followed by removal of the release substrate to form a catalyst coated membrane (CCM) with a catalyst layer having a controlled thickness and catalyst distribution. Alternatively, the catalyst layer is applied directly to the membrane, such as by printing, and the catalyst film is then dried at a temperature not greater than about 200° C.

The CCM, thus formed, is then combined with a GDB to form the MEA (30). The MEA is formed, by layering the CCM and the GDB, followed by consolidating the entire structure in a single step by heating to a temperature no greater than about 200° C., typically in the range of about 140 to about 160° C., and applying pressure. Both sides of the MEA can be formed in the same manner and simultaneously. Also, the composition of the catalyst layer and GDB may be different on opposite sides of the membrane.

The invention is illustrated in the following examples.

EXAMPLES

Example 1

Irradiated Films

ETFE films were obtained in thicknesses of 30 μm and 55 μm (Tefzel® LZ5100 and LZ5200, DuPont Company, Wilmington, Del.). PVdF films were obtained with a thickness 50 μm (Kynar® Goodfellow Corp, Berwyn, Pa.). The films were degassed and brought into a nitrogen-filled glove box. They were cut to size and sealed inside gas-barrier bags (PPD aluminum-foil-barrier bags from Shield Pack, Inc., West Monroe, La.). Dry ice pellets were placed in a metal tray for cooling and the bags with films were placed into the metal tray. The films were irradiated using an electron beam accelerator using 1 MV and a current of 2.2 mA or 4.5 MV and 25 mA. Up to 6 films were placed in each bag, and the bags were stacked up to 2 high in the tray. The beam was electronically scanned across a 40" aperture while the metal tray was moved slowly beneath the beam. Each pass resulted in a dosage of 20 kGy, and from 1 to 13 passes were used resulting in total dosages between 20 and 260 kGy. For dosages above 190 kGy, the passes were broken in to two groups with the inclusion of a three-minute pause between the groups to allow the bags to cool. The irradiated films were stored in the bags under dry ice or in a refrigerator cooled to −40° C.

Example 2

Tefzel® films from Example 1 of 27 μm thickness and irradiated to 140 kGy were brought into a nitrogen-purged glove box, cut to 35 mm×35 mm size, and weighed. Into each of three wide-mouth jars (66 mm ID×70 mm high) was placed 0.50 g of deoxygenated monomer p-$CF_2$=CF—$C_6H_4$—S($CF_2$)$_2SO_2F$, one film, solvent as indicated in the Table below, and water. A piece of Teflon® mesh was added to each jar to hold the film under the liquid, polymeric lids were attached to the jars, and the jars brought out of the glove box. The jars were placed in an incubator shaker box (New Brunswick Scientific Co., Inc. Series 25) heated to 60° C. and gently shaken at 125 rpm for 96 hr. After this grafting reaction, the liquids were poured out of the jars and tetrahydrofuran (THF) was added to each bottle. The grafted films were extracted using the THF for 18 hr at ambient temperature, after which the films were removed, dried in ambient air, and reweighed.

| Sample | Solvent | Solvent wt (g) | Wt of water (g) | Graft Level (%) |
|---|---|---|---|---|
| A | acetone | 6.5 | 3.5 | 25 |
| B | tetrahydrofuran | 6.5 | 3.5 | 11 |

Example 3

A 30 mL bottle with a stirring bar was charged with a Tefezl® film irradiated with 140 kGy dosage under nitrogen then water, solvent and monomers in amounts as listed below table were added into the bottle under $N_2$. The mixture was stirred in the sealed bottle at 60° C. for 3 days. The films were removed from the bottle water and dried in a vacuum-oven at 60° C. with nitrogen bleed for 2 hrs to give the grafted film.

Graft level was calculated as $(w_g-w)/w$, where w is the initial weight of the film and $w_g$ is the weight of the dried washed grafted film.

| Example No. | CH$_3$CN (ml) | DMSO (ml) | H$_2$O (mL) | Monomer (g) | GL % after drying |
|---|---|---|---|---|---|
| 1 | 8 |   | 17 | 1 | 165 |
| 2 | 5 |   | 20 | 1 | 193 |
| 3 | 15 |   | 10 | 1 | 168 |
| 4 | 10 |   | 15 | 1 | 173 |
| 5 |   | 15 | 10 | 1 | 109 |
| 6 |   | 5 | 20 | 1 | 48 |

What is claimed is:

1. A grafting process for making a fluorinated ion exchange polymer membrane comprising:
   (a) forming an monomer composition comprising at least one grafting monomer, in a mixture of water and one or more organic solvent;
   wherein the grafting monomer comprises one or more of 1a or 1b:

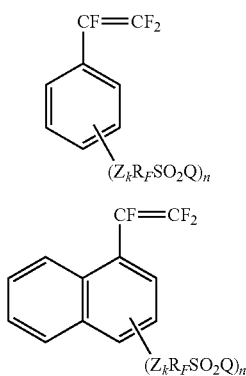

wherein
   Z is chosen from O, S, SO$_2$, or POR wherein R comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;
   R$_F$ is chosen from a linear or branched perfluoroalkylene group of 1 to 20 carbon atoms, optionally containing oxygen, sulfur or chlorine;
   Q is chosen from F, —OM, —NH$_2$, —N(M)SO$_2$R$^2_F$, and —C(M)(SO$_2$R$^2_F$)$_2$, wherein M is chosen from H, an alkali cation, or ammonium;
   R$^2_F$ groups are chosen from alkyl of 1 to 14 carbon atoms which may optionally include ether oxygens or aryl of 6 to 12 carbon atoms where the alkyl or aryl groups may be perfluorinated or partially fluorinated; and k is 0 or 1, n is 1 or 2 for 1a, and n is 1, 2, or 3 for 1b;
   (b) irradiating at least one base polymer with ionizing radiation, and
   (c) contacting at least one base polymer with the monomer composition from step (a), at a temperature of about 0° C. to about 120° C. for about 0.1 hours to about 500 hours.

2. The process of claim 1 wherein the organic solvent is miscible or at least partially soluble with water, and wherein the monomer is partially soluble in the organic solvent.

3. The process of claim 2 wherein the organic solvent is acetonitrile, dimethylformamide, dimethylacetamide, dimethylsulfoxide, or glycol ethers of the formula R(OCH$_2$CH$_2$)$_p$OR, wherein R is an alkyl group and p is 1 to 12.

4. The process of claim 1 wherein the weight % of water to the sum of water and organic solvent in the mixture is in the range of 10% to 99.99%.

5. The process of claim 4 wherein the weight % of water to the sum of water and organic solvent in the mixture is in the range of 40% to 90%.

6. The process of claim 1 wherein the organic solvent and water mixture optionally includes an enhancing additive.

7. The process of claim 6 wherein the enhancing additive is α,α,α-trifluorotoluene, dichlorobenzotrifluoride, chlorobenzotrifluoride, chlorobenzene, dichlorobenzene, trichlorobenzene, fluorobenzene, difluorobenzene, trifluorobenzene, perfluorobenzene, toluene, p-xylene, m-xylene, o-xylene, or C5-C10 aliphatic hydrocarbon, fluorohydrocarbon, fluorocarbon, or fluoroether.

8. The process of claim 4 wherein the enhancing additive is present at an amount of 0.5 to 300 weight % of the monomer.

9. The process of claim 1 wherein the at least one base polymer is in film form.

10. The process of claim 1 wherein steps (b) and (c) are performed simultaneously.

11. The process of claim 1 wherein steps (b) and (c) are performed sequentially.

12. The process of claim 1 wherein Q comprises F.

13. The process of claim 1 wherein R$_F$ is chosen from (CF$_2$)$_q$ wherein q=1 to 16, (CH$_2$)$_q$OCF$_2$CF$_2$ wherein q=1 to 12, and (CF$_2$CF(CF$_3$)O)$_q$CF$_2$CF$_2$ where q is 1 to 6, and R$^2_F$ is chosen from methyl, ethyl, propyl, butyl, and phenyl, each of which may be partially fluorinated or perfluorinated.

14. The process of claim 13 wherein R$_F$ is chosen from (CF$_2$)$_q$ wherein q=1 to 4, (CF$_2$)$_q$OCF$_2$CF$_2$ wherein q=1 to 4, and (CF$_2$CF(CF$_3$)O)$_q$CF$_2$CF$_2$ where q is 1 to 2, and R$^2_F$ is chosen from perfluoromethyl, perfluoroethyl, and perfluorophenyl.

15. The process of claim 1 wherein the base polymer comprises a homopolymer or copolymer prepared from non-fluorinated, fluorinated, or perfluorinated monomers.

16. The process of claim 15 wherein the base polymer is chosen from poly(ethylene-tetrafluoroethylene), poly(ethylene-chlorotrifluoroethylene), poly(tetrafluoroethylene-hexafluoropropylene), poly(tetrafluoroethylene-perfluoroalkyl vinyl ether), poly(tetrafluoroethylene-perfluoromethyl vinyl ether), poly(tetrafluoroethylene-perfluoropropyl vinyl ether), polytetrafluoroethylene, modified polytetrafluoroethylene, polyvinyl fluoride, polyvinylidene fluoride, poly(vinylidene fluoride-hexafluoropropylene), polyethylene, and polypropylene.

17. The process of claim 15 wherein the base polymer comprises a partially or completely fluorinated polymer.

18. The process of claim 17 wherein the base polymer is chosen from poly(ethylene-tetrafluoroethylene), poly(ethylene-tetrafluoroethylene-termonomer), poly(tetrafluoroethylene-hexafluoropropylene), poly(tetrafluoroethylene-perfluorovinylether), polytetrafluoroethylene, poly(ethylene-chlorotrifluoroethylene); poly(vinylidene fluoride), and poly(vinylidenefluoride-hexafluoropropylene).

19. A polymer membrane made by the process of claim 1.

* * * * *